(12) United States Patent
Hakola et al.

(10) Patent No.: US 11,522,274 B2
(45) Date of Patent: Dec. 6, 2022

(54) FACILITATING USER EQUIPMENT BEAMFORMING CONTROL

(71) Applicant: Nokia Technologies Oy, Espoo (FI)

(72) Inventors: Sami Hakola, Kempele (FI); Jorma Kaikkonen, Oulu (FI); Juha Karjalainen, Oulu (FI); Mihai Enescu, Espoo (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/147,228

(22) Filed: Sep. 28, 2018

(65) Prior Publication Data

US 2020/0106168 A1 Apr. 2, 2020

(51) Int. Cl.
*H01Q 1/24* (2006.01)
*G06F 1/16* (2006.01)
*H04B 7/06* (2006.01)

(52) U.S. Cl.
CPC .......... *H01Q 1/246* (2013.01); *G06F 1/1698* (2013.01); *H04B 7/0617* (2013.01)

(58) Field of Classification Search
CPC ... H04L 5/0048; H04L 5/0091; H04L 5/0023; H04B 7/0617; H04B 7/0628; H04B 7/088; H04B 7/0874; H04B 7/0695; H04W 8/22; H04W 52/42; H04W 52/146; H04W 52/245; H04W 52/365; H04W 52/0212; H04W 76/28; H04W 52/0229; H01Q 1/246; G06F 1/1698; Y02D 30/70
See application file for complete search history.

(56) References Cited

U.S. PATENT DOCUMENTS

| | | | |
|---|---|---|---|
| 2017/0171740 A1* | 6/2017 | Wu | H04W 76/27 |
| 2017/0366994 A1* | 12/2017 | Akkarakaran | H04L 5/0051 |
| 2018/0063693 A1* | 3/2018 | Chakraborty | H04W 8/005 |
| 2018/0227094 A1 | 8/2018 | Bin | |
| 2018/0255607 A1 | 9/2018 | Sumeeth | |
| 2018/0309526 A1* | 10/2018 | Zhang | H04L 5/0023 |

(Continued)

FOREIGN PATENT DOCUMENTS

WO WO 2017/074488 A1 5/2017

OTHER PUBLICATIONS

Nokia, et al., Remaining issues on beam management, 3GPP TSG RAN WG1 meeting, Apr. 2018, 13 pages.

(Continued)

*Primary Examiner* — Congvan Tran
(74) *Attorney, Agent, or Firm* — Mintz, Levin, Cohn, Ferris, Glovsky and Popeo, P.C.

(57) ABSTRACT

Methods and apparatus, including computer program products, are provided for beamforming control. In some example embodiments, there may be provided a method. The method may include providing, by a user equipment configured to include a plurality of antenna panels, capability information to a base station, the capability information including antenna panel information regarding the plurality of antenna panels; and providing, by the user equipment, antenna panel usage information to the base station, the antenna panel usage information indicative of which of the plurality of antenna panels are in at least one of an active transmit state or an active receive state.
Related systems, methods, and articles of manufacture are also disclosed.

16 Claims, 7 Drawing Sheets

(56) References Cited

U.S. PATENT DOCUMENTS

| | | | | |
|---|---|---|---|---|
| 2019/0081753 A1* | 3/2019 | Jung | .................... | H04B 7/0617 |
| 2019/0223033 A1* | 7/2019 | Nam | .................... | H04B 7/0689 |
| 2020/0007282 A1* | 1/2020 | Yoon | ................ | H04W 36/0058 |
| 2020/0029274 A1* | 1/2020 | Cheng | ................ | H04W 72/042 |
| 2021/0314128 A1* | 10/2021 | Li | ........................ | H04L 5/0078 |

OTHER PUBLICATIONS

International Searching Authority At the European Patent Office, International Search Report and Written Opinion for PCT/EP2019/073308, dated Oct. 31, 2019, 17 pages.

Huawei & Hi Silicon, "Discussion on panel-based UL beam selection," 3rd Generation Partnership Project (3GPP), 3GPP TSG RAN WG1 Meeting #94, R1-1809122, Gothenburgm Sweden, Aug. 20-24, 2018, 7 pages.

* cited by examiner

Provide to a base station capability information including antenna panel information regarding a plurality of antenna panels at the user equipment 350

Determine which of the plurality of antenna panels are in at least one of the active transmit state or the active receive state 352

Provide to the base station antenna panel usage information indicative of which of the plurality of antenna panels are in at least one of an active transmit state or an active receive state 354

FACILITATING USER EQUIPMENT BEAMFORMING CONTROL

FIELD

The subject matter described herein relates to beamforming.

BACKGROUND

In 5G, user equipment may be configured to operate using multiple beams via, for example, multiple input, multiple output (MIMO) technology. The use of MIMO may allow a user equipment to dramatically increase data rate capabilities. However, the use of multiple beams may present technical challenges with respect to beamforming control between a user equipment and a 5G node B base station (gNB).

SUMMARY

Methods and apparatus, including computer program products, are provided for beamforming control.

In some example embodiments, there may be provided a method. The method may include providing, by a user equipment configured to include a plurality of antenna panels, capability information to a base station, the capability information including antenna panel information regarding the plurality of antenna panels; and providing, by the user equipment, antenna panel usage information to the base station, the antenna panel usage information indicative of which of the plurality of antenna panels are in at least one of an active transmit state or an active receive state.

In some variations, one or more of the features disclosed herein including the following features can optionally be included in any feasible combination. The antenna panel usage information may be provided to the base station in response to a request from the base station. The antenna panel usage information may be provided to the base station in response to a change in a state of at least one antenna panel being used to at least one of transmit an uplink or receive a downlink. The user equipment may receive a request for a layer 1 reference symbol received power measurement and an indication of at least one antenna panel used to make the layer 1 reference symbol received power measurement. The user equipment may send response to the base station, the response including the layer 1 reference symbol received power measurement and the indication. The user equipment may change to a power saving state at the user equipment by at least placing at least one of the antenna panels in at least one of an inactive transmit state or an inactive receive state. In response to the change, an updated antenna panel usage information may be provided to the base station. The user equipment may determine which of the plurality of antenna panels are in at least one of the active transmit state or the active receive state. The capability information provided to the base station may include a quantity of transceivers available for at least one of a transmit and/or a receive and a quantity of how many of the plurality of the antenna may be active at any given time for transmission or reception. The provided antenna panel usage information may indicate which of the plurality of antenna panels are used for at least one of receiving or transmitting a channel, the channel comprising at least one of a physical downlink control channel, a physical downlink shared channel, a physical uplink control channel, or a physical uplink shared channel. The user equipment may receive a request from the base station, the request indicating the channel and the antenna panel usage information for the channel.

In some example embodiments, there may be provided a method. The method may include receiving, at a base station, capability information of a user equipment, the capability information including antenna panel information regarding the plurality of antenna panels at the user equipment; and receiving, at the base station, antenna panel usage information provided by the user equipment, the antenna panel usage information indicative of which of the plurality of antenna panels are in at least one of an active transmit state or an active receive state.

In some variations, one or more of the features disclosed herein including the following features can optionally be included in any feasible combination. The base station may select a beam for a downlink or an uplink, the selection based on the received antenna panel usage information and measurement reporting obtained from active antenna panels indicated in the antenna panel usage information. The antenna panel usage information may be received in response to a request sent to the user equipment. The antenna panel usage information may be received in response to a change in a state of at least one antenna panel being used to at least one of transmit an uplink or receive a downlink. The base station may send a request for a layer 1 reference symbol received power measurement and an indication of at least one antenna panel used to make the layer 1 reference symbol received power measurement. The base station may receive a response including the layer 1 reference symbol received power measurement and the indication. The capability information provided to the base station may include a quantity of transceivers available for at least one of a transmit and/or a receive and a quantity of how many of the plurality of the antenna may be active at any given time for transmission or reception. The base station may receive the antenna panel usage information indicating which of the plurality of antenna panels are used for at least one of receiving or transmitting a channel, the channel comprising at least one of a physical downlink control channel, a physical downlink shared channel, a physical uplink control channel, or a physical uplink shared channel. The base station may send a request to the user equipment, the request indicating the channel and the antenna panel usage information for the channel.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

In 5G, user equipment may be more likely to include multiple transmit antennas and/or receive antennas (also referred to as antenna panels, antenna modules, and the like) in order to provide spherical coverage, for example. For example, a user equipment may include four antenna panels located on 4 different sides of the user equipment, but the user equipment may have fewer radio transceivers due to cost, size, and/or power constraints. As such, the user equipment may be in an operating mode in which fewer than the 4 antennas are being used at any given time.

Given wideband analog-to-digital converters and digital-to-analog converters that may be used for wide system bandwidth demands, the user equipment may need to optimize power consumption by switching off one or more antenna panels and/or transceivers (coupled to the antenna panels) that are not being used, at a given time, for reception or transmission.

A base station, such as a 5G Node B base station (e.g., gNB), may not be aware of the quantity of antenna panels that are actively being used, at any given time, for transmission or reception. And, the 5G base station may not be aware of which subset of antenna panels are being used, at any given time, at the UE for transmission or reception. This may lead to situations in which the quantity of antenna panels actively being used for transmission or reception may be more than needed. For example, if the gNB has current information regarding the antenna panels at the user equipment, the gNB may control and thus optimize the quantity of antenna panels actively being used by the user equipment.

In some example embodiments, the user equipment (UE) may provide to the base station an indication of the current antenna panels actively being used at the UE for transmission and/or reception.

In some example embodiments, the base station may send to the UE a request for a response including the indication of the current antenna panels actively being used for transmission and/or reception.

Figure 1:
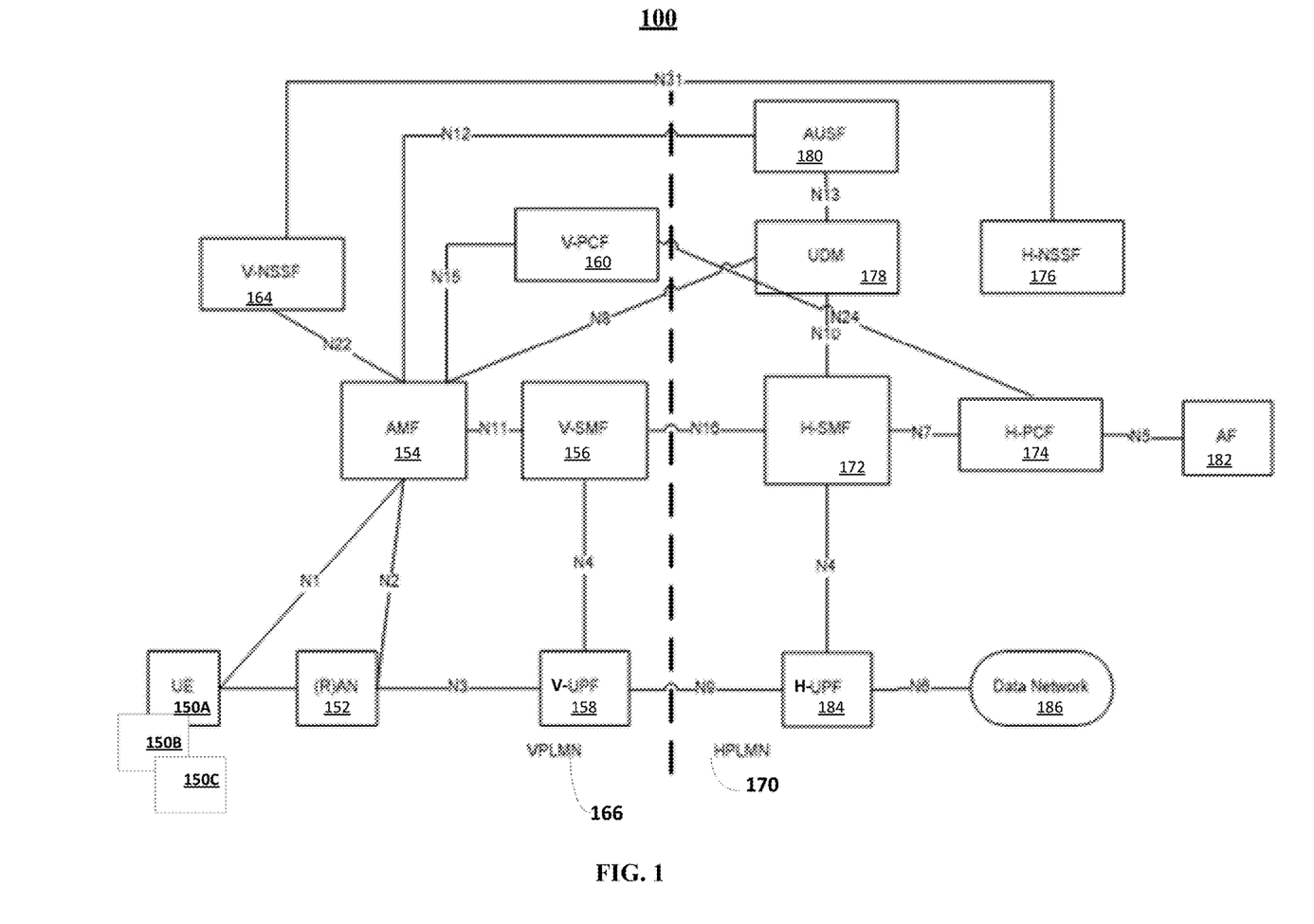
FIG. 1 depicts an example of a portion of the 5G system, in accordance with some example embodiments.

Before providing additional description regarding the UE beamforming control disclosed herein, an example of a portion of a 5G wireless network 100 is described with respect to FIG. 1.

The 5G wireless network 100 may include a user equipment (UE) 150A-C configured to wirelessly couple to a radio access network (RAN) 152 being served by a wireless access point, such as a base station (e.g., an LTE/4G eNB base station, a 5G gNB base station), and/or other type of wireless access point. When visiting a network, the UE may access the network's radio access network.

The network 100 may include a core network, which may include an access and mobility management function (AMF) 154, a visiting session management function (V-SMF) 156, a visiting policy control function (v-PCF) 160, a visiting network slice selection function (v-NSSF) 164, and/or a visiting user plane function (V-UPF) 158. In the example of FIG. 1, devices 152-164 may be associated with a visiting public land mobile network (VPLMN) 166.

The network 100 and/or the core network may include devices having functions supporting a home public land mobile network (HPLMN) 170 as well. For example, these devices in the HPLMN 170 may include devices and corresponding functions for "home" wireless local area network (WLAN) access, offloading, and/or non-3GPP access. These devices may include a home SMF 172, a home PCF 174, a home NSSF 176, unified data management 178, an authentication server function (AUSF) 180, an application function (AF) 182, a home user plane function (H-UPF) 184, and a data network (DN) 186.

FIG. 1 also depicts service interfaces, such as N1, N2, N3, N4, N6, N7, N11, N15, N18, N24, and/or the like. The architecture, nodes (including AMF, V-PCF, H-PCF, H-SMF, and V-SMF as well as other devices depicted at FIG. 1), and the service interfaces may be defined in accordance with a standard, such as 3GPP TS 23.501, although other standards as well as proprietary interfaces may be used. Although FIG. 1 depicts a single visiting network and a single home network, other quantities of visiting and/or home network may be included as well.

Figure 2:
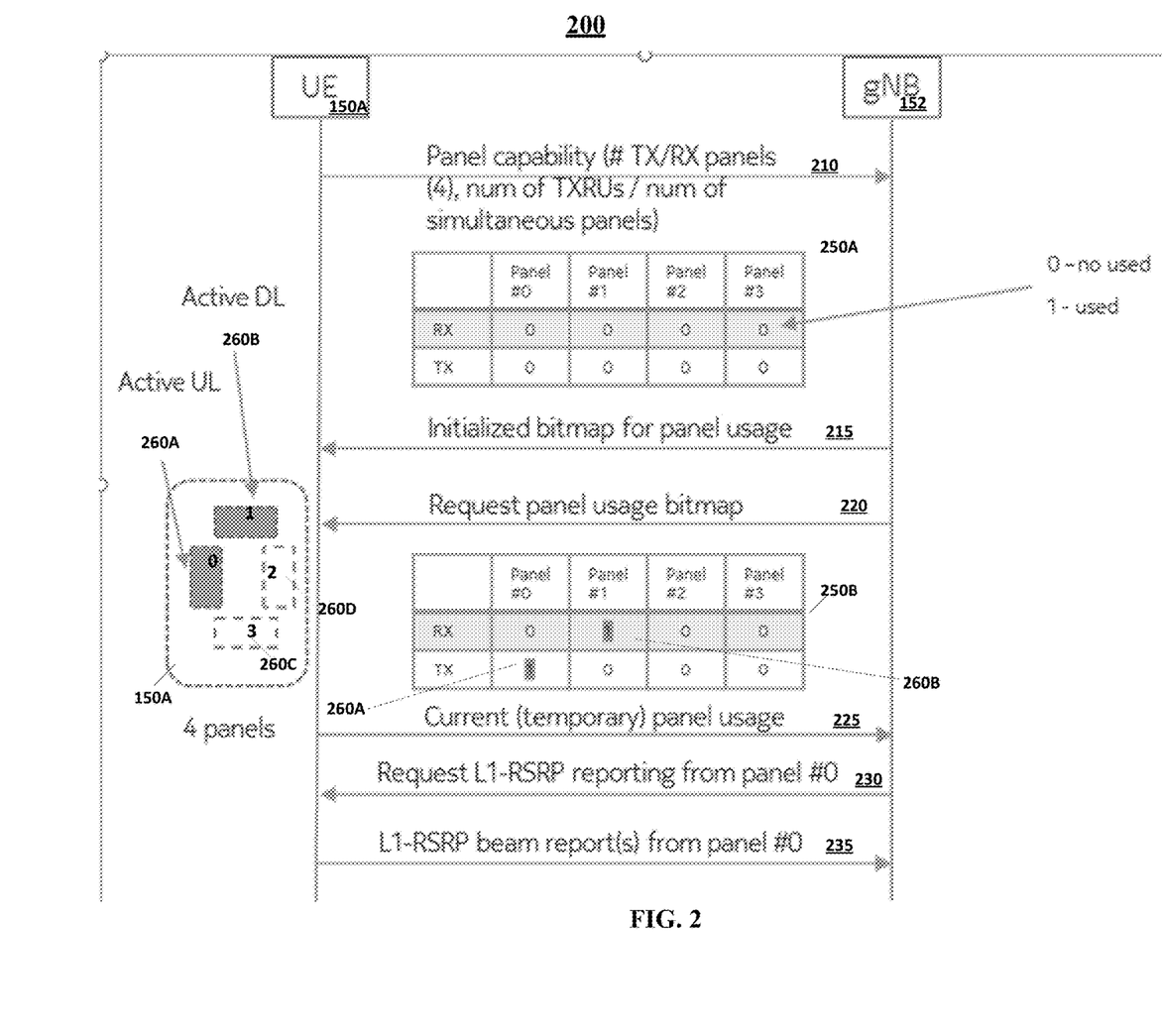
FIG. 2 depicts an example of a process for beamforming control, in accordance with some example embodiments.

FIG. 2 depicts an example of a process 200 for UE beamforming control, in accordance with some example embodiments. FIG. 2 depicts a user equipment, such as user equipment 150A, and a 5G base station, such as gNB 152. In the example of FIG. 2, the UE 150A includes 4 antenna panels 260A-D, with only two panels 260A-B currently active for transmission to, or reception from, the base station 152. Although the example of FIG. 2 shows 4 antenna panels 260A-D, the UE may include other quantities of antenna panels as well.

To facilitate UE beamforming control by the gNB base station 152, the gNB 152 is made aware of the current quantity of antenna panels actively being used at the UE 150A. The quantity of antenna panels that are active at any given time may be dynamic (or semi-static) in the sense that this quantity may change from time-to-time based on the current mode or configuration of the UE 152.

The process 200 may provide a dynamic (or semi-static) controllable UE antenna panel condition information object, 250A-B, through which the gNB 152 and UE 150A may remain synchronized with respect to the quantity of antenna panels currently active for downlink beam transmission reception and/or uplink beam transmission. At any given time, an antenna panel may be in an active transmit state, which refers to the UE's current usage of the antenna panel for an uplink transmission. And if the UE stops using an antenna panel to conserve power consumption for example, the antenna panel may be in an inactive transmit state. Likewise, an antenna panel may be in an active receive state, which refers to the UE's current usage of the antenna panel for an downlink reception, so if the UE stops using the antenna panel, the antenna panel may be in an inactive receive state.

Although FIG. 2 and some of the examples herein refer to the quantity of antenna panel information being conveyed via object 250A-B, this antenna panel usage information may be conveyed in other formats as well.

In some example embodiments, the information object 250A-B may structured as, for example, a 2×N bitmap, wherein N is the quantity of antenna panels signaled by the UE 150A to the gNB 152. The information object may be exchanged during a capability negotiation phase between the UE and gNB (e.g., via system information blocks (SIB) and/or the like), although the information object may be exchanged at other times as well. In the example of FIG. 2, the first row of the information object 250A provides information regarding which antenna panels at the UE 150A are currently being used for receiving a downlink beam from the gNB 152 and the second row provides information regarding which antenna panels are currently being used for transmitting an uplink beam to the gNB 152.

In some example embodiments, the UE 150A may provide the object 250B as part of feedback reporting to gNB 152. For example, the UE 150A may provide, for example, a bitmap indicating which antenna panels are receiving the downlink beams measurement reports related to Layer 1-Reference Signal Received Power (L1-RSRP), Channel State Information (CSI), etc.

In some example embodiments, the UE 150A may provide to gNB 152 the object 250B or the bitmap indicating which antenna panels are currently being used to receive certain downlink physical channels, such as the activated downlink beams for the Physical Downlink Control Channel (PDCCH) and/or the Physical Downlink Shared Channel (PDSCH). Alternatively or additionally, the UE 150A may provide to gNB 152 the object 250B or the bitmap indicating which antenna panels are currently being used to transmit certain uplink channels, such as the Physical Uplink Control Channel (PUCCH) and/or the Physical Uplink Shared Channel (PUSCH).

In some example embodiments, the gNB 152 may select beams for the downlink and/or the uplink. For example, the gNB 152 may select downlink beams based measurements on downlink reference signals, such as the channel state information (CSI) reference signal (RS) and/or synchronization signal block (SSB), and select the uplink beams based on measurements of uplink RSs, such as the sounding reference signal (SRS). To illustrate further, the gNB configures the UE to transmit SRS resources with different transmit beams at each antenna panel, and then the gNB selects, based on SRS measurements, an antenna panel and a specific beam of the antenna panel for PUCCH, PUSCH, or SRS for uplink CSI acquisition. There may be one or more SRS resource sets configured for the UE and associated to an antenna panel, so SRS resources within those sets may be transmitted using beams of the same antenna panel. Certain SRS resource may be restricted to be part of the SRS resource set(s) associated to the certain antenna panel (e.g., the SRS resource may not be associated to multiple panels). The antenna panel and beam selection for uplink transmission may thus be performed by indicating the SRS resource representing a certain transmit beam of a certain antenna panel.

In some example embodiments, an association may be defined or configured between at least one SRS resource set and a bit in the bitmap indicative of the currently active antenna panels at the UE. This association links the SRS resource set and a UE's uplink antenna panel. The association may apply for SRS resource sets configured for beam management. For example, based on received beam reports and information regarding which panels are used to receive downlink beams, the gNB may trigger corresponding SRS resource sets for uplink beam selection. This uplink signal based beam selection is an approach to determine the uplink beam (which may take into account possible transmit power reductions required by the UE for the certain spatial direction that are not revealed by the pure downlink RS based L1-RSRP measurements). For example, with SRS based uplink beam selection (where the UE transmits multiple SRS resources using different transmit beams), the gNB may measure and then select, based on the measurements, the transmission beams (from corresponding antenna panels) to be used for some incoming uplink transmissions. This approach may take into account potential transmit power reductions required at the UE due to, for example, heating and the like. If the transmit beam is pointing towards a human body for example, the downlink RS based measurement for uplink transmit beam selection may not reveal the required transmit power back off but it would be revealed in SRS based uplink beam selection. Beam correspondence refers to the node determining the transmit beam from the received beam (e.g., based on received signal using a certain receive beam, the node is able to determine a corresponding transmit beam).

Another approach for determining the UL beam is to provide additional information, such as power headroom, together with L1-RSRP measurements, in order to provide insight on the uplink beam strength after potential TX power back off/reductions that cannot be revealed from the L1-RSRP measurement result alone. This may enable the gNB to select for instance downlink and uplink beams so that UE would be able to use the same panel(s) for both.

For the configuration of a SRS resource set for non-codebook and codebook, each SRS resource may correspond to a UE antenna panel. And whether (or not) the certain resource is "active" (when triggering transmission of the SRS resource set) determines which SRS resources are transmitted. The gNB may configure SRS resources for all UE antenna panels (some of them may be active at a time). The gNB may be aware of the active SRS resources of the SRS resource set from synchronized bitmap/object information. When scheduling the uplink transmission, the SRS resource indicator (SRI) in the downlink control information (DCI) may refer only to SRS resources corresponding to current active panels. To illustrate further, the gNB at this phase may be aware of active panels for uplink transmission. Given four panels, only two antenna panels active, and a two-bit indication field available to select SRS resources (e.g., UE's antenna panels) for actual transmission, this two-bit indication field selects one of the two active panels or both (bit map) for the transmission.

The gNB may also explicitly request the UE to measure downlink reference symbols (RSs) for beam management using certain receive antenna panel(s) indicated by the bitmap, in accordance with some example embodiments.

After the UE's initial access, the UE may operate a downlink using the same antenna panels as the antenna panels used for the uplink. Alternatively or additionally, the UE may operate a downlink using antenna panels that are different from the antenna panels used for the uplink. For example, the UE may use different antennas for the downlink and the uplink. Alternatively or additionally, the UE may use two antennas for the uplink and the downlink, and also use two other antenna panels for the downlink only. These are examples as other configuration of uplink and downlink antenna panels may be implemented as well.

At 210, the UE 150A may provide information to the gNB regarding antenna panel capability, in accordance with some example embodiments. This antenna panel capability information may include a quantity of transmit and/or receive antenna panels, a quantity of transmit and/or receive antenna units (e.g., transceivers), a quantity of the antenna panels that may be simultaneously active for transmission or reception at any given time. For example, when the UE initially establishes or requests access to the gNB, the UE may provide, at 210, the quantity of panels available in DL and UL, the quantity of transceiver units, and/or the UE's capability for how many panels can be simultaneously active at a given time.

At 215, the gNB 152 may provide an initialized bit map, in accordance with some example embodiments. For example, the gNB may provide to the UE an initialized bitmap corresponding to UE's antenna panels for transmit (TX) and/or receive (RX). In the example of FIG. 2, the object 250A includes an initialized bit map, although the information may be provided to the UE in other formats.

At 220, the gNB 152 may request the UE's 150A current state with respect to antenna panel usage, in accordance with some example embodiments. For example, the gNB may send a request to the UE to provide the currently active antenna panels, such as antennal panels being used for receiving the downlink and transmitting the uplink.

For example, the gNB 152 may trigger the UE 150A to transmit on configured aperiodic SRS resource sets corresponding to the currently active UE antenna panels (without an activation delay) to determine the uplink transmit beam being used among the active panels. In this way, the gNB may avoid triggering the SRS resource set corresponding to an inactive panel without taking into account the antenna panel switch on time. This may allow the gNB to request the UE to provide beam reports using antenna panels used for selected uplink beams. This may also enable coordinated UE beam (refinement) measurements in a multi-TRP (Transmission and Reception Point) scenario where the UE may be connected to multiple TRPs but is able to receive/transmit from/to only one TRP at a time (e.g. limited number of active panels at a time).

At 225, the UE 150A may provide to the gNB 152 the current antenna panel usage information, in accordance with some example embodiments. In the example of FIG. 2, the UE 150A has antenna panel 260A currently in active use for transmission on an uplink while antenna panel 260B is currently in active use for a downlink to the UE. As such, the current antenna panel information, as depicted at object 250B, includes antenna panel "#1" 260B in a receive (RX) state and antenna panel "#0" 260A in a transmit (TX) state.

At 230, the gNB 152 may request certain measurement reporting, such as L1-RSRP reporting, associated with one or more antenna panels at UE 150A, in accordance with some example embodiments. For example, the gNB may request the UE to provide a bitmap (or information object) and the L1-RSRP results for the downlink beams, wherein the bitmap/object indicates the UE's antenna panel(s) for the measurements. For example, the request sent at 230 may specify the measurement report requested (e.g., the L1-RSRP) and/or the antenna panel at the UE to be used for the measurement (which in this example is antenna panel "#0" 260A).

At 235, the UE 150A may respond to the gNB 152 with the requested measurement report (e.g., the L1-RSRP measurements) and/or the antenna panel at the UE to be used for the measurement (which in this example is antenna panel "#0" 260A).

The UE 150A may trigger uplink signal transmission to the gNB 152 to indicate an antenna panel change at the UE. If UE 150A stops or starts using an antenna panel 260A-D for receiving a beam or transmitting a beam, the UE may provide the updated antenna panel usage information to the gNB (e.g., via a bitmap such as object 250B). To illustrate further, both downlink and uplink beams may be determined based on the downlink RSs, so the UE may, due to rotation for instance, switch which antenna panels are handling a receive beam and/or a transmit beams. By indicating the gNB about panel switching(s), the gNB may update the panel usage situation at UE.

Figure 3A:
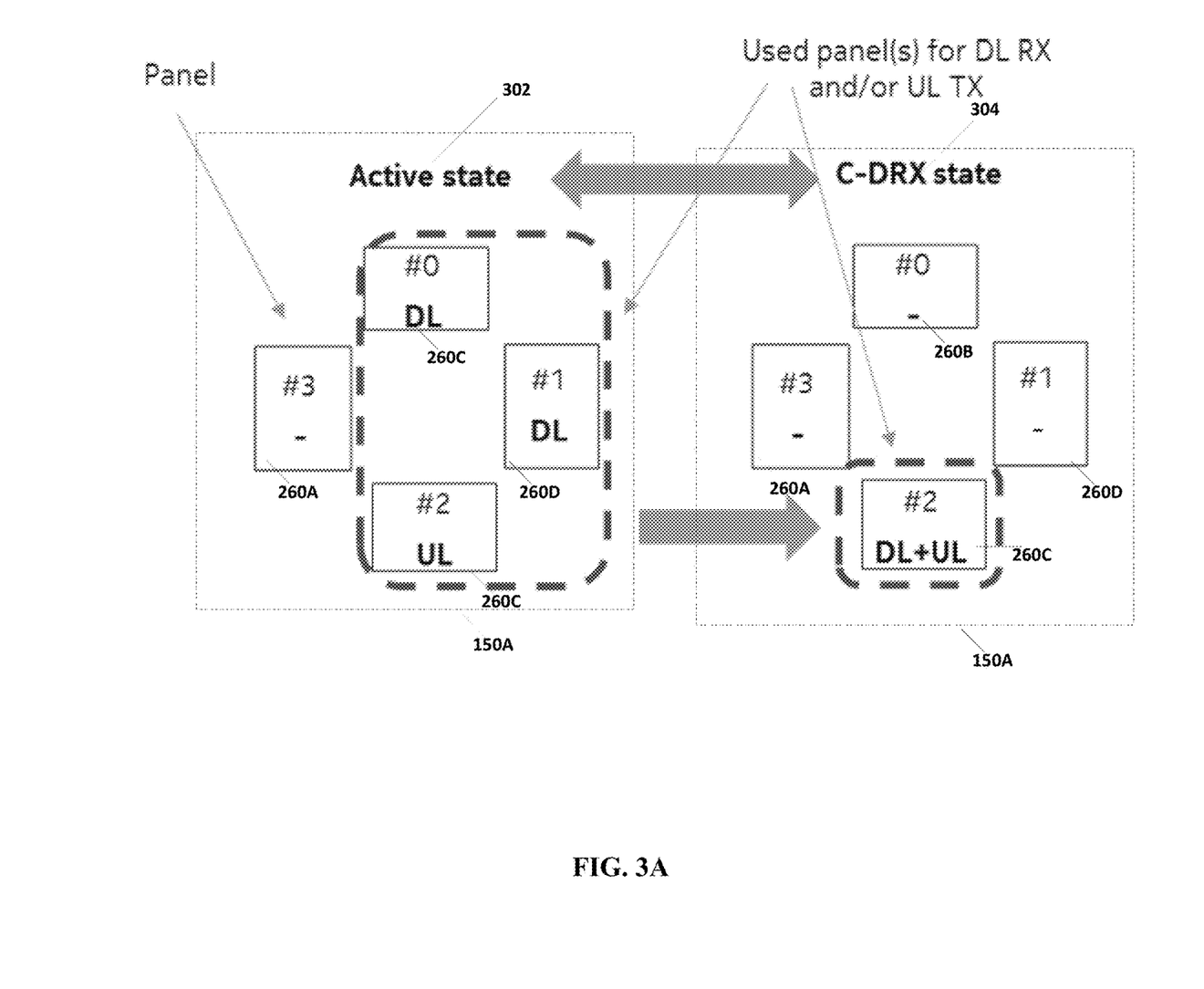
FIG. 3A depicts another example of beamforming control, in accordance with some example embodiments.

FIG. 3A depicts another example of beamforming control, in accordance with some example embodiments. Specifically, FIG. 3A shows driving the UE 150A from an active state at 302 to a power saving state at 304 and the correspond antenna panel correspondence for transmit and receive. In active state 302, the UE 150A may have connections to multiple transmit-receive processors (TRPs, e.g., transceiver units) and may use multiple antenna panels 260C-D for downlinks and antenna panel 260D for the uplink. In order to provide an efficient power saving state, the UE may use fewer, such as only one panel, for downlink receive and uplink transmit while in the power saving state. To that end, that the following can be implemented.

For the power saving mode (e.g. Connected State Discontinuous Reception (C-DRX)), the UE's downlink receive and uplink transmit beams are targeted to be handled by the same antenna panel/module, such as panel 260C. That is achieved by providing to the UE a bitmap about the receive antenna panel (e.g. corresponding to the panel used for UL TX beam) for which to provide L1-RSRP measurements for downlink beam selection. The UE provides L1-RSRP measurements using the antenna panel corresponding to given bitmap. The gNB selects downlink beam if the L1-RSRP level is adequate (e.g., both the downlink receive beam and the uplink transmit beam can be from the same panel). The TX/RX beam correspondence at 260C and 304 may be associated to the power saving state.

Figure 3B:
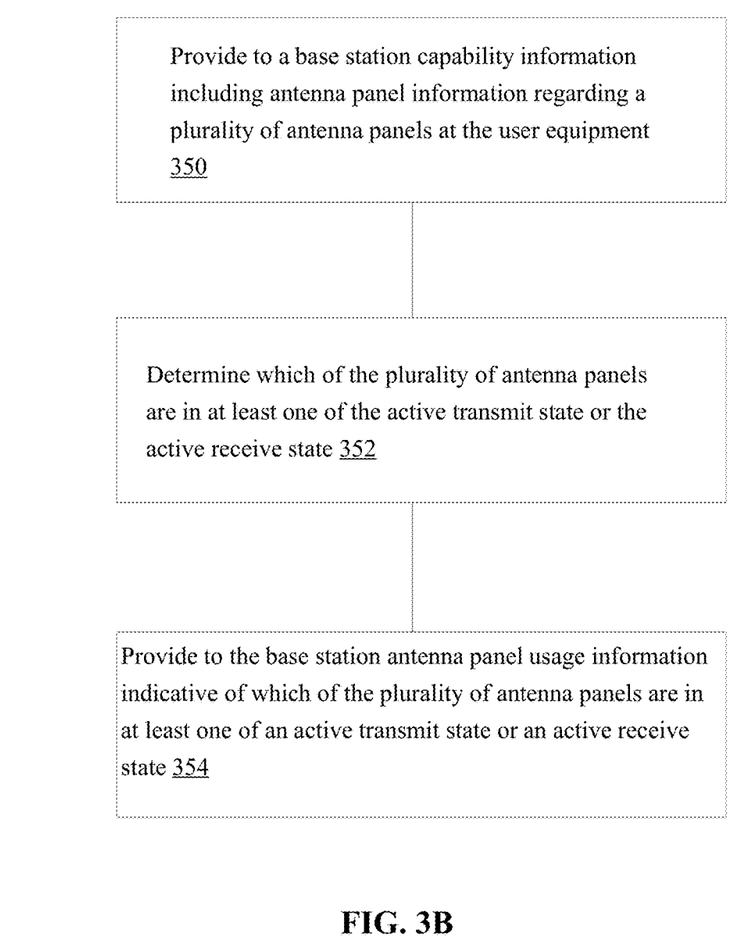
FIG. 3B-FIG. 3C depict additional examples of processes of beamforming control, in accordance with some example embodiments.

FIG. 3B depicts an example process, in accordance with some example embodiments.

At 350, a user equipment may provide to a base station capability information including antenna panel information regarding a plurality of antenna panels at the user equipment, in accordance with some example embodiments. For example, the user equipment 150A may provide antenna panel information (e.g., such as quantity of antenna panels, quantity of transceivers, and/or how many of the antenna panels can be used simultaneously) to base station 152 as noted above at 210. This antenna capability information may enable the base station to send initialization information (e.g., 215) to the UE and/or a requests (e.g., 220 and/or 230) to the UE.

At 352, the user equipment may determine which of the plurality of antenna panels are in at least one of the active transmit state or the active receive state, in accordance with some example embodiments. For example, user equipment 150A may be configured with 4 antenna panels 260A-D. In the example of FIG. 2, antenna panel 260B is being used actively for downlink reception (e.g., an active receive state), while antenna panel 260A is actively being used for the uplink transmission (e.g., active transmit state).

At 354, the user equipment may provide to the base station antenna panel usage information indicative of which of the plurality of antenna panels are in at least one of an active transmit state or an active receive state, in accordance with some example embodiments. For example, user equipment 150A may send the currently active panel usage information as described above with respect to 225. This information may enable the base station to control the beams as the UE.

Figure 3C:
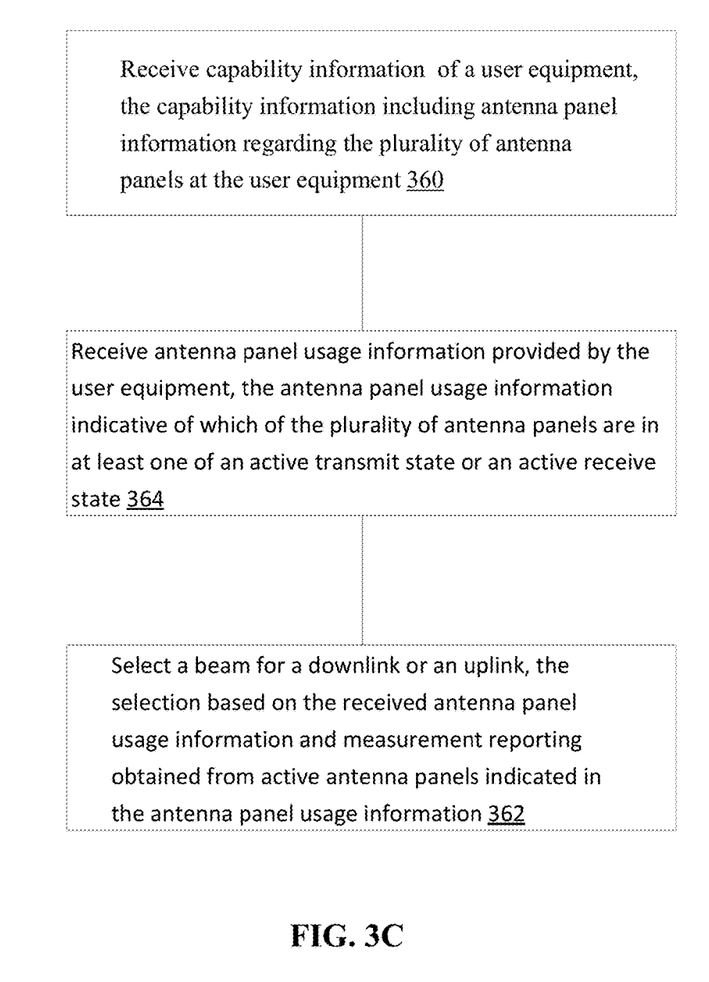

FIG. 3C depicts another example of a process, in accordance with some example embodiments.

At 360, a base station may receive capability information of a user equipment, the capability information including antenna panel information regarding the plurality of antenna panels at the user equipment, in accordance with some example embodiments. For example, the base station 152 may receive antenna panel information (e.g., such as quantity of antenna panels, quantity of transceivers, and/or how many of the antenna panels can be used simultaneously) as noted above at 210.

At 362, a base station may receive antenna panel usage information provided by the user equipment, the antenna panel usage information indicative of which of the plurality of antenna panels are in at least one of an active transmit state or an active receive state, in accordance with some example embodiments. For example, base station 152 may receive from equipment 150A which antenna panels 260A-D are currently being used for transmission or reception as noted above at 225.

At 364, the base station may select a beam for a downlink or an uplink, the selection based on the received antenna panel usage information and measurement reporting obtained from active antenna panels indicated in the antenna panel usage information, in accordance with some example embodiments. For example, the base station may request certain measurement reporting (e.g., L1-RSRP-related reporting, CSI-related reporting, etc.) and request that the measurement be made via certain antenna panels. With respect to the uplink beams, the base station may select an uplink transmit beam by requesting antenna panel usage information for the SRS reference set(s) transmitted on the uplink beam(s) and then select beams based on measurements of the reference sets. In this way, the base station may control selection of an antenna panel and corresponding beam.

Figure 4:
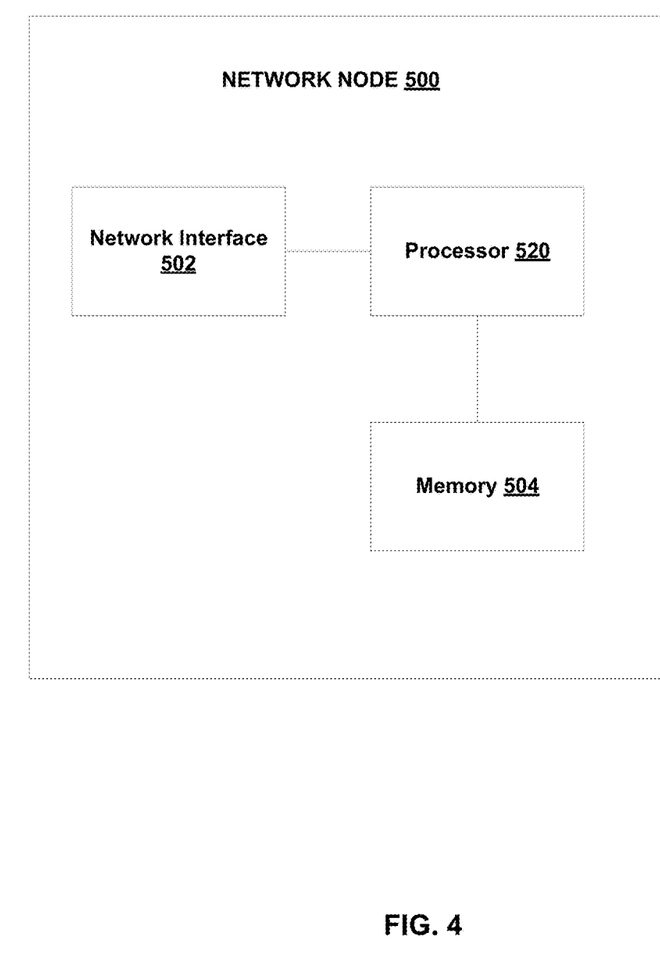
FIG. 4 depicts an example of a network node, in accordance with some exemplary embodiments.

FIG. 4 depicts a block diagram of a network node 500, in accordance with some example embodiments. The network node 500 may be configured to provide one or more network side operations as described with respect to base station 152, for example.

The network node 500 may include a network interface 502, a processor 520, and a memory 504, in accordance with some example embodiments. The network interface 502 may include wired and/or wireless transceivers to enable access other nodes including base stations, devices 152-180, the Internet, and/or other nodes. The network interface may also provide a radio access network to serve the UEs. The network interface may thus include the radio technology noted below with respect to the apparatus 10. The memory 504 may comprise volatile and/or non-volatile memory including program code, which when executed by at least one processor 520 provides, among other things, the processes disclosed herein with respect to the base station (see, e.g., FIGS. 2, 3C, etc.).

Figure 5:
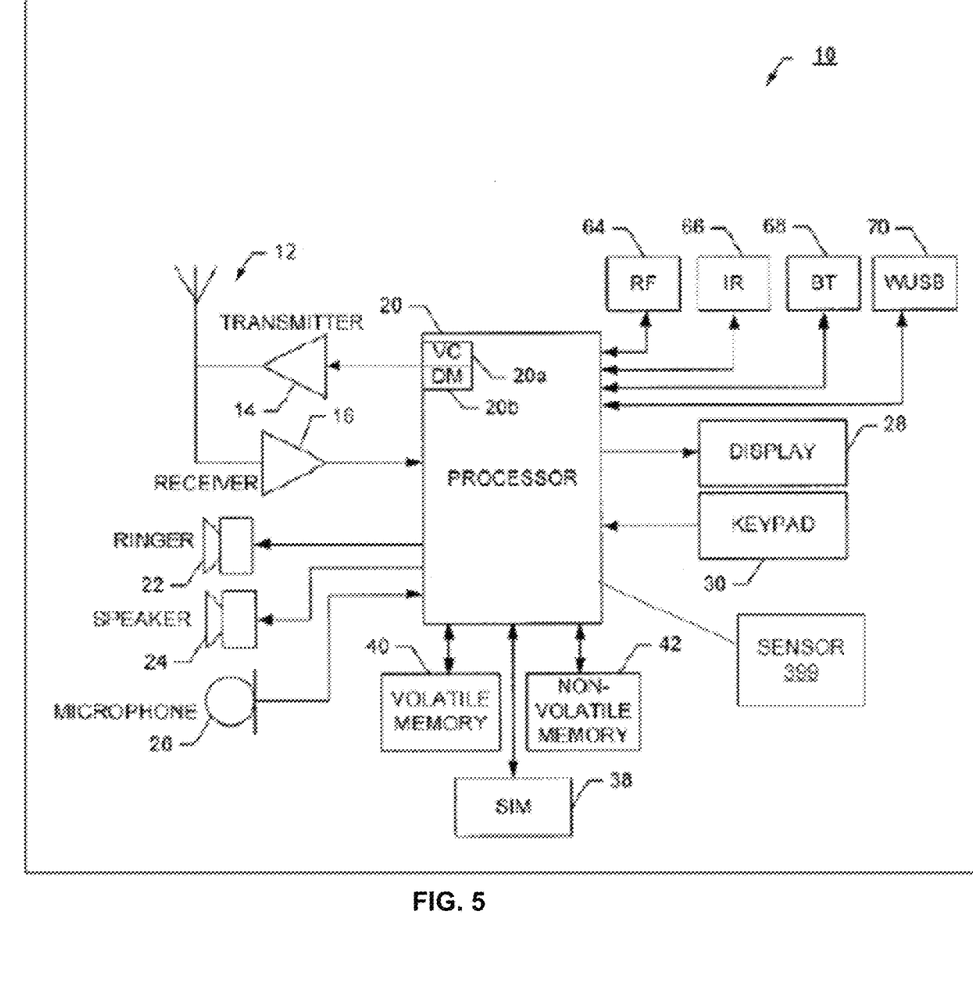
FIG. 5 depicts an example of an apparatus, in accordance with some exemplary embodiments.

FIG. 5 illustrates a block diagram of an apparatus 10, in accordance with some example embodiments. The apparatus 10 may provide a user equipment.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to the user equipment (see, e.g., FIGS. 2, 3A, 3B, etc.).

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UEs.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be UE and base station synchronization with respect to the UE's antenna panel usage in the downlink and uplink which can be utilized, for example, in uplink beam selection. Alternatively or additionally, a technical effect may also include providing a way for the gNB to explicitly control UE antenna panels that may enable provide UE power savings.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method comprising:
   providing, by a user equipment configured to include a plurality of antenna panels, capability information to a base station, the capability information including antenna panel information regarding the plurality of antenna panels;
   changing, at the user equipment, to a power saving mode by placing at least one of the plurality of antenna panels in at least one of an inactive transmit state and an inactive receive state; and
   in response to the change that places at least one of the plurality of antenna panels in at least one of an inactive transmit state and an inactive receive state, providing, by the user equipment, antenna panel current usage information to the base station, the antenna panel current usage information indicative of which of the plurality of antenna panels are actively being used for at least one of receiving or transmitting a channel, the channel comprising at least one of a physical downlink control channel, a physical downlink shared channel, a physical uplink control channel, or a physical uplink shared channel.

2. The method of claim 1, wherein the antenna panel current usage information is provided to the base station in response to a request from the base station.

3. The method of claim 1, wherein in response to a change in state of the user equipment, the antenna panel current usage information is provided dynamically to the base station, wherein the change in state comprises a change in a state of at least one antenna panel actively being used to at least one of transmit an uplink or receive a downlink.

4. The method of claim 1 further comprising:
   receiving, by the user equipment, a request for a layer 1 reference symbol received power measurement and an indication of at least one antenna panel used to make the layer 1 reference symbol received power measurement; and
   sending, by the user equipment, a response to the base station, the response including the layer 1 reference symbol received power measurement and the indication, wherein the indication is provided as part of the antenna panel current usage information.

5. The method of claim 1 further comprising:
   determining, by the user equipment, which of the plurality of antenna panels are in at least one of the active transmit state or the active receive state.

6. The method of claim 1, wherein the capability information provided to the base station further includes at least one of a quantity of transceivers available for at least one of a transmit or a receive or a quantity of how many of the plurality of the antenna panels may be active at any given time for transmission or reception.

7. The method of claim 1 further comprising:
   receiving, by the user equipment, a request from the base station, the request indicating the channel and the antenna panel current usage information for the channel.

8. The method of claim 1, wherein the antenna panel current usage information indicative of which of the plurality of antenna panels are actively being used for at least one of receiving or transmitting a channel comprising a control channel, the control channel comprising at least one of the physical downlink control channel, the physical downlink shared channel, the physical uplink control channel, or the physical uplink shared channel.

9. An apparatus comprising:
   at least one processor; and
   at least one memory including computer program code, the at least one memory and the computer program code configured to, with the at least one processor, cause the apparatus to at least:
   provide capability information to a base station, the capability information including antenna panel information regarding a plurality of antenna panels at the apparatus;
   change, at the apparatus, to a power saving state by placing at least one of the plurality of antenna panels in at least one of an inactive transmit state and an inactive receive state; and
   in response to the change that places at least one of the plurality of antenna panels in at least one of an inactive transmit state and an inactive receive state, provide antenna panel current usage information to the base station, the antenna panel current usage information indicative of which of the plurality of antenna panels are actively being used for at least one of receiving or transmitting a channel, the channel comprising at least one of a physical downlink control channel, a physical downlink shared channel, a physical uplink control channel, or a physical uplink shared channel.

10. The apparatus of claim 9, wherein the antenna panel current usage information is provided to the base station in response to a request from the base station.

11. The apparatus of claim 9, wherein in response to a change in state of the apparatus, the antenna panel current usage information is provided dynamically to the base station, wherein the change in state comprises a change in a state of at least one antenna panel actively being used to at least one of transmit an uplink or receive a downlink.

12. The apparatus of claim 9, wherein the apparatus is further caused to at least:
receive a request for a layer 1 reference symbol received power measurement and an indication of at least one antenna panel used to make the layer 1 reference symbol received power measurement; and
send a response to the base station, the response including the layer 1 reference symbol received power measurement and the indication, wherein the indication is provided as part of the antenna panel current usage information.

13. The apparatus of claim 9, wherein the apparatus is further caused to at least:
determine which of the plurality of antenna panels are in at least one of the active transmit state or the active receive state.

14. The apparatus of claim 9, wherein the capability information provided to the base station further includes at least one of a quantity of transceivers available for at least one of a transmit or a receive or a quantity of how many of the plurality of the antenna panels may be active at any given time for transmission or reception.

15. The apparatus of claim 9, wherein the apparatus is further caused to at least:
receive a request from the base station, the request indicating the channel and the antenna panel current usage information for the channel.

16. A non-transitory computer-readable storage medium including program code which when executed by at least one processor causes operations comprising:
providing, by a user equipment configured to include a plurality of antenna panels, capability information to a base station, the capability information including antenna panel information regarding the plurality of antenna panels;
changing, at the user equipment, to a power saving state by placing at least one of the plurality of antenna panels in at least one of an inactive transmit state and an inactive receive state; and
in response to the change that places at least one of the plurality of antenna panels in at least one of an inactive transmit state and an inactive receive state, providing, by the user equipment, antenna panel current usage information to the base station, the antenna panel current usage information indicative of which of the plurality of antenna panels are actively being used for at least one of receiving or transmitting a channel, the channel comprising at least one of a physical downlink control channel, a physical downlink shared channel, a physical uplink control channel, or a physical uplink shared channel.

* * * * *